United States Patent [19]
Akiyama et al.

[11] Patent Number: 5,126,864
[45] Date of Patent: Jun. 30, 1992

[54] FERROELECTRIC LIQUID CRYSTAL PANEL HAVING A FERROELECTRIC OPTICAL COMPENSATING LIQUID CRYSTAL CELL

[75] Inventors: Ryouichi Akiyama, Kawasaki; Kazuhisa Ui, Tokyo; Koutaro Yoneda; Masafumi Ide, both of Yokohama, all of Japan

[73] Assignee: Stanley Electric Company, Tokyo, Japan

[21] Appl. No.: 481,139

[22] Filed: Feb. 16, 1990

[30] Foreign Application Priority Data

Mar. 14, 1989 [JP] Japan ................... 1-59744

[51] Int. Cl.⁵ ............................... G02F 1/133
[52] U.S. Cl. ........................ 359/53; 359/56; 359/63; 359/73
[58] Field of Search ............... 350/335, 350 S, 347 E, 350/347 R, 337, 332, 333; 340/784

[56] References Cited

U.S. PATENT DOCUMENTS

| | | | |
|---|---|---|---|
| 3,881,808 | 5/1975 | Gurtler et al. | 350/335 |
| 4,408,839 | 10/1983 | Wiener-Avnear | 350/335 |
| 4,634,226 | 1/1987 | Isogai et al. | 350/350 S |
| 4,715,688 | 12/1987 | Harada et al. | 350/333 |
| 4,909,606 | 3/1990 | Wada et al. | 350/347 E |

FOREIGN PATENT DOCUMENTS

| | | | |
|---|---|---|---|
| 0091637 | 10/1983 | European Pat. Off. | 350/350 S |
| 0219480 | 4/1987 | European Pat. Off. | 350/350 S |
| 2578994 | 9/1986 | France . | |
| 0218423 | 12/1984 | Japan | 350/350 S |
| 0134736 | 6/1986 | Japan | 350/350 S |
| 0147434 | 7/1987 | Japan | 350/350 S |
| 0182719 | 8/1987 | Japan | 350/350 S |

Primary Examiner—John Zazworsky
Assistant Examiner—Tai V. Duong
Attorney, Agent, or Firm—Dykema Gossett

[57] ABSTRACT

A ferroelectric liquid crystal panel comprising 2 layers of liquid crystal cells, each of which comprises a ferroelectric crystal sealed between two substrates and then is laminated together; wherein one of said liquid crystal cells is operated as a panel driving liquid crystal cell and the other of said liquid crystal cells is operated as an optical compensating cell, while both said liquid crystal cells being driven by rectangular wave AC signals. Furthermore, the ferroelectric liquid crystal panel is constructed to operate in an intermediate tone by varying the phases of said rectangular wave AC signals applied to the liquid crystal cells of the first and second layers.

1 Claim, 2 Drawing Sheets

FERROELECTRIC LIQUID CRYSTAL PANEL HAVING A FERROELECTRIC OPTICAL COMPENSATING LIQUID CRYSTAL CELL

BACKGROUND OF THE INVENTION

1. Field of the Invention

The present invention relates to a liquid crystal indication device or a liquid crystal panel used for a shutter array, etc used for a printer head, and more particularly to a ferroelectric liquid crystal panel using a ferroelectric liquid crystal.

2. Description of the Prior Art

A liquid crystal panel using a ferroelectric liquid crystal, known in the prior art, comprises a liquid crystal cell containing a liquid crystal sealed between, for example, 2 glass substrates like a liquid crystal panel using an ordinary nematic liquid crustal, and is operated as a display panel or an optical shutter by applying a driving voltage across transparent electrodes equipped inside the glass substrates. However, the ferroelectric liquid crystal has a high dielectric constant and is different from a nematic liquid crystal in that it is driven by DC (Direct Current) for turning ON and OFF according the direction (positive or negative) of an electric field applied. In addition, the voltage-transmittance characteristics thereof are not completely known. Therefore, for displaying the panel in an intermediate tone. It is required to vary the ON/OFF ratio at high response speed or altering the area ratio of ON/OFF.

One of the drawbacks associated with the driving a ferroelectric liquid crystal panel with DC as described above, is that it tends to cause premature deterioration of the liquid crystal cell when it is used to display intermediate tones. This premature deterioration manifests itself by causing the display pixels to vary in brightness. In addition, the pixels deteriorate irregularly, resulting in the difficulty of driving the panel stably.

SUMMARY OF THE INVENTION

The present invention has been accomplished in order to solve such a problem, while aiming at preventing the deterioration of a liquid crystal cell and providing a ferroelectric liquid crystal panel capable to drive a panel stably.

A ferroelectric crystal panel according to the present invention comprises 2 layers of liquid crystal cells, each of which comprises a ferroelectric crystal sealed between two substrates and then is laminated together; wherein one of said liquid crystal cells is operated as a panel driving liquid crystal cell and the other of said liquid crystal cells is operated as an optical compensating cell, while both said liquid crystal cells being driven by rectangular wave AC signals. According to another aspect of the present invention the ferroelectric liquid crystal panel is constructed to operate in an intermediate tone by varying the passes of said rectangular wave AC signals applied to the liquid crystal cells of the first and second layers.

With a ferroelectric liquid crystal panel according to the present invention, 2 layers of liquid crystal cells are stacked, each of which is driven by a rectangular wave AC signal. Therefore, deterioration of the liquid crystal cells is effectively prevented while also enabling to display in an intermediate tone.

DETAILED DESCRIPTION OF PREFERRED EMBODIMENTS

Figure 1:
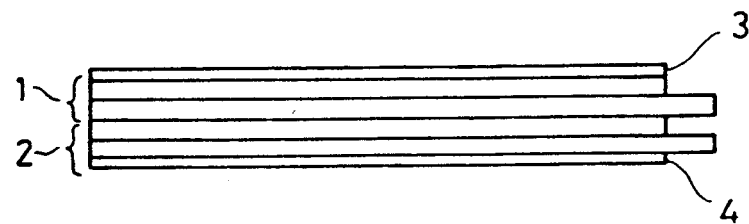
FIG. 1 is a structure view which shows the outline of an embodiment ferroelectric liquid crystal panel of the present Invention.

FIG. 1 is a structure view showing the outline of an embodiment of the ferroelectric liquid crystal panel according to the present Invention. This liquid crystal panel comprises 2 stacked layers of liquid crystal cells in which ferroelectric liquid crystals are sealed between upper and lower glass substrates. One of them is operated as a liquid crystal cell of driving panel indication while the other acting as an optical compensating liquid crystal cell. More explicitly, numeral 1 in the figure represents said optical compensating liquid crystal cell while numeral 2 represents a panel indication driving crystal cell. Inside upper and lower glass substrates of each of said liquid crystal cells 1 and 2, there are transparent electrodes implemented as well as oriented films of ferroelectric liquid crystals. Each liquid crystal cell 1 or 2 is driven by a rectangular wave signal (AC). Numerals 3,4 show polarization plates equipped outside the crystal cells 1,2.

Figure 2A:
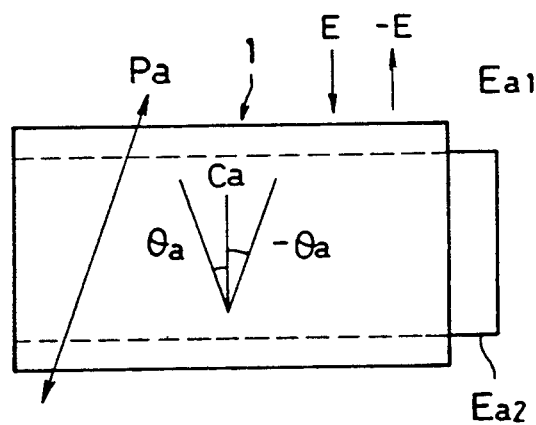
FIG. 2(a) and (b) are descriptive view of the detailed composition of each liquid crystal cell shown in FIG. 1.

FIG. 2(a), (b) denote detailed structures of said each liquid crystal cell 1 or 2. The optical compensating cell 1 is provided with totally flat transparent electrodes Ea1 and Ea2 which are located parallel and anti-parallel to the rubbing axis Ca in relation to the rubbing direction of the upper and lower glass substrates. Angles between the direction of molecules of the liquid crystals (axis) and the rubbing axis Ca, when electric fields E or −E are applied to the crystal cell 1, are defined by $\theta a$ or $-\theta a$, respectively. Then, the angle of polarization access Pa of the polarization plate 3 stuck in the upper side of the liquid crystal cell 1 and said rubbing axis Ca is also $-\theta a$.

The panel indication driving liquid crystal cell 2 is also provided with display-patterned transparent electrodes Eb1 and Eb2, while taking the same parallel and anti-parallel rubbing relationships with the upper and lower glass substrates the same as said optical compensating liquid crystal cell 1. Rubbing axes Ca and Cb, of which cells are all orthogonal. Angles between liquid crystals' molecular direction and rubbing axis Cb when electric fields E and −E are applied to the liquid crystal cell 2, are defined as $\theta b$ and $-\theta b$. Then, the polarization axis Pb of the lower polarization plate 4 of said liquid crystal cell 2 takes an angle of $-\theta b$ to the rubbing axis Cb.

Next, the operation of the embodiment is described in the following.

With such a liquid crystal panel as structured in the above, 2-layer liquid crystal cells 1,2 are assumed to be constructed in the same liquid crystal of the same cell thickness. Then, the following relationship holds valid.

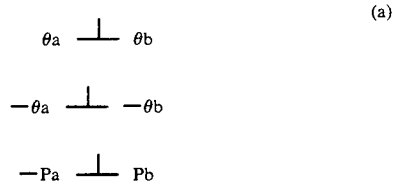

(a)

Figure 3:
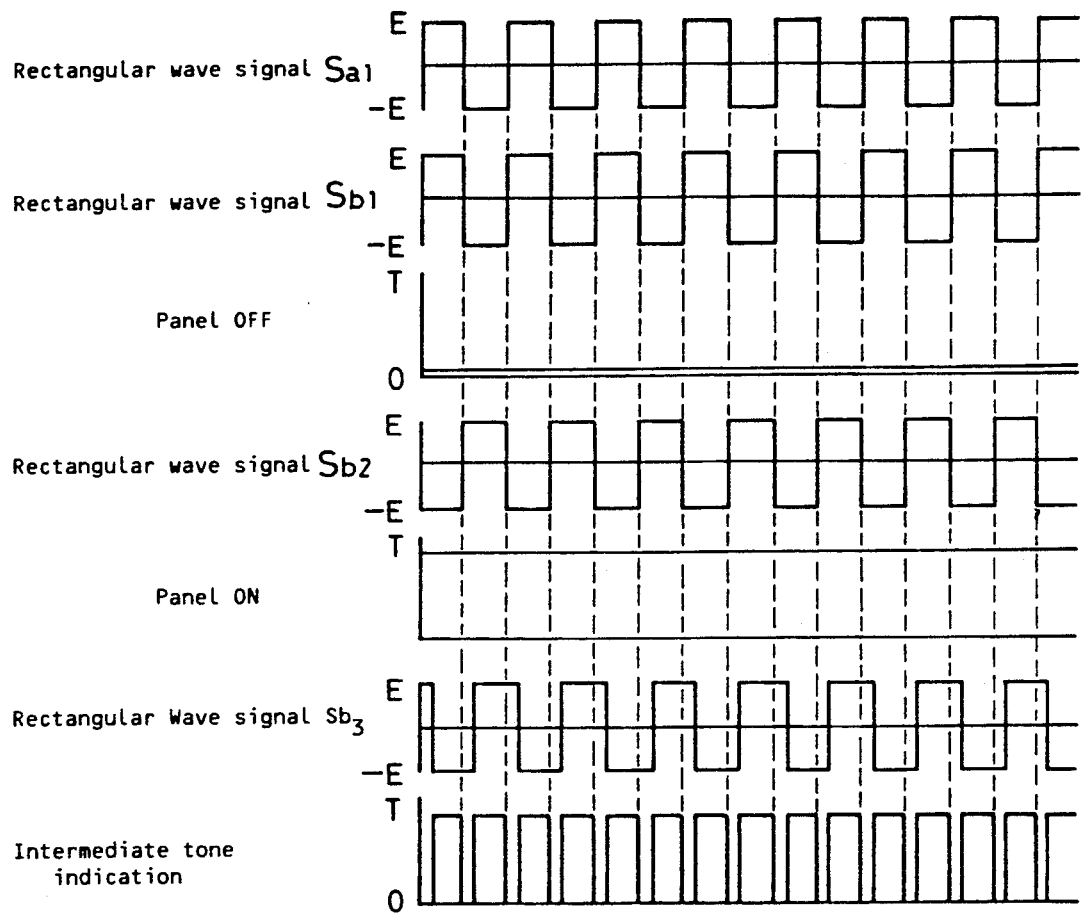
FIG. 3 is a wave form view to show the operation of the liquid crystal panel of FIG. 1.

In addition, by applying a rectangular wave signal shown in FIG. 3 between the electrodes of each liquid crystal 1 and 2, a preferred pattern including those in an intermediate tone, can be displayed.

More exactly, a rectangular wave signal Sa1 between electric fields E and −E shown in FIG. 3 is first applied to the upper liquid crystal cell 1, while applying a rectangular wave signal Sb1 in the same phase as the rectangular wave signal Sa1 to the lower liquid crystal cell 2. At that time, liquid crystal molecules in the liquid crystal cells 1 and 2 are combined in ($\theta a$, $\theta b$), ($-\theta a$, $-\theta b$), ($\theta a$, $\theta b$), ($-\theta a$, $-\theta b$), etc. According to the relationship of (a) above light does not transmit because double refraction is canceled in ($\theta a$, $\theta b$). Likewise, light does not transmit in ($-\theta a$, $-\theta b$) since the polarization of light is in agreement with the polarization axis Pa, Pb of the polarization plate but not in agreement with axis 4. Thus it is seen that light does not transmit (i.e. T=0) when ($\theta_a$, $\theta_b$) or ($-\theta_a$, $-\theta_b$).

Next, a rectangular wave signal Sb2 in the phase reversed said rectangular wave signal Sa1 is applied to the indication unit of the liquid crystal cell 2 while maintaining the liquid crystal cell 1 as it is. Then, the liquid crystal molecules of the cells 1 and 2 are combined ($\theta a$, $-\theta b$), ($-\theta a$, $\theta b$), ($\theta a$, $-\theta b$), ($-\theta a$, $\theta b$), etc. In ($\theta a$, $-\theta b$), double refraction occurs in the liquid crystal cell 1 at an angle of $\theta a$ allowing light to transmit. In the liquid crystal cell 2, light transmits but no double refraction occurs in the liquid crystal cell 2 since the direction of liquid crystal molecules becomes parallel to the polarization axes Pb of the polarization plate 4 at an angle of $-\theta b$. Therefore, light can transmit both liquid crystal cell 1 and liquid crystal cell 2. In ($-\theta a$, $\theta b$), light can transmit through the liquid crystal cells 1 and 2 by way of similar principles. As a result, provided that the specifications of the liquid crystal cells 1 and 2 are the same, panel ON status occurs.

Another rectangular wave signal Sb3, on which the phase is lightly shifted from the rectangular wave signal Sa1, is applied next to the liquid crystal cell 2. At that time, the ratio of transmitted light to shutoff light can be changed according to the ratio of the same phase component to the reverse phase one of the rectangular wave AC signal Sb3. Displaying in intermediate tone is also operable by making this status respond at a high speed.

In this way, a liquid crystal panel using a ferroelectric liquid crystal can be driven by a rectangular wave AC signal, thereby preventing the deterioration of the liquid crystal cells and maintaining stabilized driving of the panel.

Figure 2B:
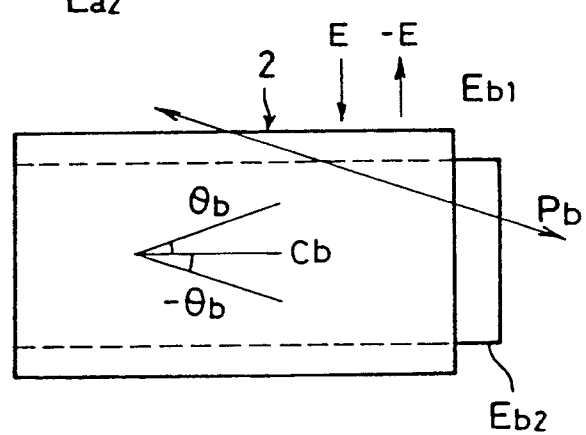
Figure 4A:
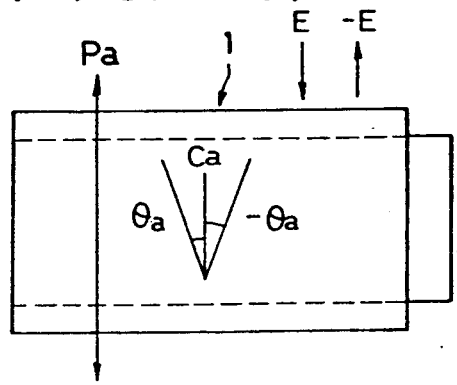
FIG. 4 (a) and (b) shows a structure view of the liquid crystal cell in which the rubbing axis is made parallel to the polarization axis.
Figure 4B:
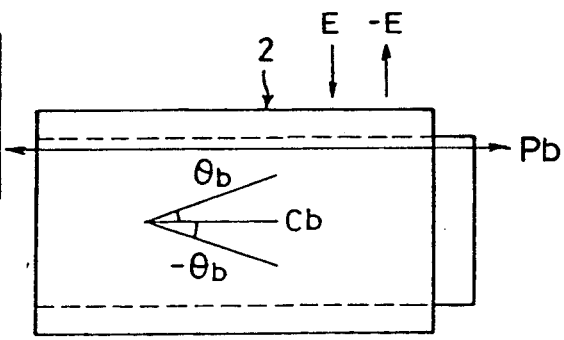

Another embodiment of the present invention is shown in FIG. 4(a) and (b), in which the rubbing axis Ca of an optical compensation liquid crystal cell 1 is aligned parallel to a polarization axis Pa of a polarization plate 3, while making the rubbing axis Cb of a panel indication driving liquid crystal cell 2 parallel to a polarization axis Pb of polarization plate 4. This embodiment can also provide the same effect as that shown by the first embodiment, under the same cell conditions as FIG. 2.

The liquid crystal according to the present invention is applicable to optical shutter arrays for printer heads and other optical shutters as well as the liquid crystal indication device shown in the embodiments.

According to the present invention, a panel driving liquid crystal cell and an optical compensating liquid crystal cell are laminated into 2-layer liquid crystal cells while each liquid crystal cell being drivable by a rectangular wave AC signal. Thus, deterioration of the liquid crystal cells can be prevented while driving the panel under stabilized conditions. In addition, displaying in intermediate tone can also be activated by varying the phase of the rectangular wave AC signal.

What is claimed is:

1. A ferroelectric liquid crystal panel comprising 2 layers of liquid crystal cells disposed between two polarizers, each of said cells comprising a ferroelectric liquid crystal sealed between two substrates, wherein said cells are laminated together and, wherein one of said liquid crystal cells is operated as a panel driving liquid crystal cell and the other of said liquid crystal cells is operated as an optical compensating cell, both said liquid crystal cells being driven individually by rectangular wave AC signals and wherein said ferroelectric liquid crystal panel is operated in an intermediate tone by varying the phases of said rectangular wave AC signals applied to the liquid crystal cells of the first and second layers.

* * * * *